(12) United States Patent
Himmelmann

(10) Patent No.: US 10,807,722 B2
(45) Date of Patent: Oct. 20, 2020

(54) CABIN AIR COMPRESSOR MOTOR COOLING FLOW ENHANCEMENT COWL

(71) Applicant: Hamilton Sundstrand Corporation, Charlotte, NC (US)

(72) Inventor: Richard A. Himmelmann, Beloit, WI (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 590 days.

(21) Appl. No.: 15/646,589

(22) Filed: Jul. 11, 2017

(65) Prior Publication Data
US 2019/0016465 A1 Jan. 17, 2019

(51) Int. Cl.
*B64D 13/08* (2006.01)
*B64D 13/06* (2006.01)
*B64D 33/02* (2006.01)
*B64D 13/02* (2006.01)

(52) U.S. Cl.
CPC ............ *B64D 13/08* (2013.01); *B64D 13/06* (2013.01); *B64D 13/02* (2013.01); *B64D 2013/0618* (2013.01); *B64D 2013/0644* (2013.01); *B64D 2033/024* (2013.01)

(58) Field of Classification Search
CPC ........................ B64D 13/08; B64D 2013/0618
See application file for complete search history.

(56) References Cited

U.S. PATENT DOCUMENTS

| 7,188,488 | B2 | 3/2007 | Army, Jr. et al. |
| 9,302,776 | B2 | 4/2016 | Cuthbert |
| 9,764,846 | B2 * | 9/2017 | Bizzarro ................ B64D 13/08 |
| 10,526,091 | B2 * | 1/2020 | Beckman ............... B64D 13/08 |
| 10,625,868 | B2 * | 4/2020 | daSilva ..................... F02C 6/08 |
| 2001/0025506 | A1 | 10/2001 | Buchholz et al. |
| 2010/0258655 | A1 | 10/2010 | Solntsev et al. |
| 2014/0048229 | A1 | 2/2014 | Cuthbert |
| 2015/0104301 | A1 | 4/2015 | Colson et al. |
| 2017/0002747 | A1 * | 1/2017 | Fert .......................... F01D 25/24 |

FOREIGN PATENT DOCUMENTS

| EP | 2808257 A1 | 12/2014 |
| WO | 03037715 A1 | 5/2003 |

OTHER PUBLICATIONS

EP Application No. EP18182893.0 Extended EP Search Report dated Sep. 12, 2018, 9 pages.

* cited by examiner

*Primary Examiner* — Brian M O'Hara
(74) *Attorney, Agent, or Firm* — Cantor Colburn LLP

(57) ABSTRACT

A cabin air compressor (CAC) motor cooling flow enhancement cowl includes a cowl body contoured to extend from a CAC motor cooling duct discharge of a ram air outlet header. The cowl body includes a backward facing step to form an air dam in a ram air flow path to divert ram system air away from the CAC motor cooling duct discharge. The CAC motor cooling flow enhancement cowl also includes a coupling interface formed at an upstream end of the cowl body to engage with a transition edge of the CAC motor cooling duct discharge.

13 Claims, 12 Drawing Sheets

CABIN AIR COMPRESSOR MOTOR COOLING FLOW ENHANCEMENT COWL

BACKGROUND

This disclosure relates to aircraft environmental control systems, and more particularly, a cabin air compressor motor cooling flow enhancement cowl for a ram air outlet header of an aircraft environmental control system.

Many types of aircraft use ram air flow for various purposes, such as in cooling systems for an aircraft. For example, ram air flow may be utilized to remove heat from various aircraft lubrication and electrical systems and/or used to condition aircraft cabin air. When the aircraft is in flight, the movement of the aircraft creates a sufficient source of ram air flow which can be used for the purposes described above. When the aircraft is on the ground or is operating at low speeds, a fan is typically utilized to increase air flow to the cooling systems. Cooling flow is drawn at a ram air inlet through a ram inlet header and heat exchangers to a ram air outlet header, the fan, and a ram air outlet. The cooling flow can also directly supply cooling air for various components, such as fan and compressor bearings. A ram air system can receive discharge air from heated components such as motor windings. Pressure differentials between components of a ram air system can limit the effectiveness of cooling flows supported by the ram air system

BRIEF SUMMARY

In an embodiment, a cabin air compressor (CAC) motor cooling flow enhancement cowl includes a cowl body and a coupling interface. The cowl body is contoured to extend from a CAC motor cooling duct discharge of a ram air outlet header. The cowl body includes a backward facing step to form an air dam in a ram air flow path to divert ram system air away from the CAC motor cooling duct discharge. The coupling interface is formed at an upstream end of the cowl body to engage with a transition edge of the CAC motor cooling duct discharge.

In addition to one or more of the features described above, or as an alternative to any of the foregoing embodiments, further embodiments may include where the cowl body forms a CAC motor cooling duct extension channel with respect to a bell mouth of the ram air outlet header upstream from a ram air fan inlet interface of the ram air outlet header.

In addition to one or more of the features described above, or as an alternative to any of the foregoing embodiments, further embodiments may include where the CAC motor cooling duct extension channel is sized to partially extend into the bell mouth when the coupling interface is engaged with the transition edge of the CAC motor cooling duct discharge.

In addition to one or more of the features described above, or as an alternative to any of the foregoing embodiments, further embodiments may include where the CAC motor cooling duct extension channel is sized to extend in the bell mouth beyond the ram air fan inlet interface when the coupling interface is engaged with the transition edge of the CAC motor cooling duct discharge.

In addition to one or more of the features described above, or as an alternative to any of the foregoing embodiments, further embodiments may include where a channel height of the CAC motor cooling duct extension channel is less than a channel height at the CAC motor cooling duct discharge.

In addition to one or more of the features described above, or as an alternative to any of the foregoing embodiments, further embodiments may include where a channel height of the CAC motor cooling duct extension channel is greater than a channel height at the CAC motor cooling duct discharge.

In addition to one or more of the features described above, or as an alternative to any of the foregoing embodiments, further embodiments may include where the coupling interface is contoured to at least partially wrap around an interior surface of a CAC motor cooling duct of the ram air outlet header and an interior surface of the bell mouth.

In an embodiment, a ram air outlet header includes a header body and a CAC motor cooling flow enhancement cowl. The header body includes a CAC motor cooling duct that intersects a ram air fan flow path at a CAC motor cooling duct discharge in a bell mouth upstream from a ram air fan inlet interface. The CAC motor cooling flow enhancement cowl includes a cowl body that extends from the CAC motor cooling duct discharge with a backward facing step that forms an air dam in the ram air flow path to divert ram system air away from CAC motor cooling duct discharge.

In an embodiment, a method of installing a CAC motor cooling flow enhancement cowl in a ram air outlet header is provided. The method includes positioning a cowl body comprising a backward facing step of the CAC motor cooling flow enhancement cowl to form an air dam in a ram air flow path of the ram air outlet header to divert ram system air away from a CAC motor cooling duct discharge in a bell mouth upstream from a ram air fan inlet interface of the ram air outlet header. A coupling interface of the CAC motor cooling flow enhancement cowl is fastened to a transition edge of the CAC motor cooling duct discharge.

A technical effect of embodiments is achieved by a CAC motor cooling flow enhancement cowl that forms an air dam in a ram air flow path to divert ram system air away from a CAC motor cooling duct discharge of a ram air outlet header as described herein.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
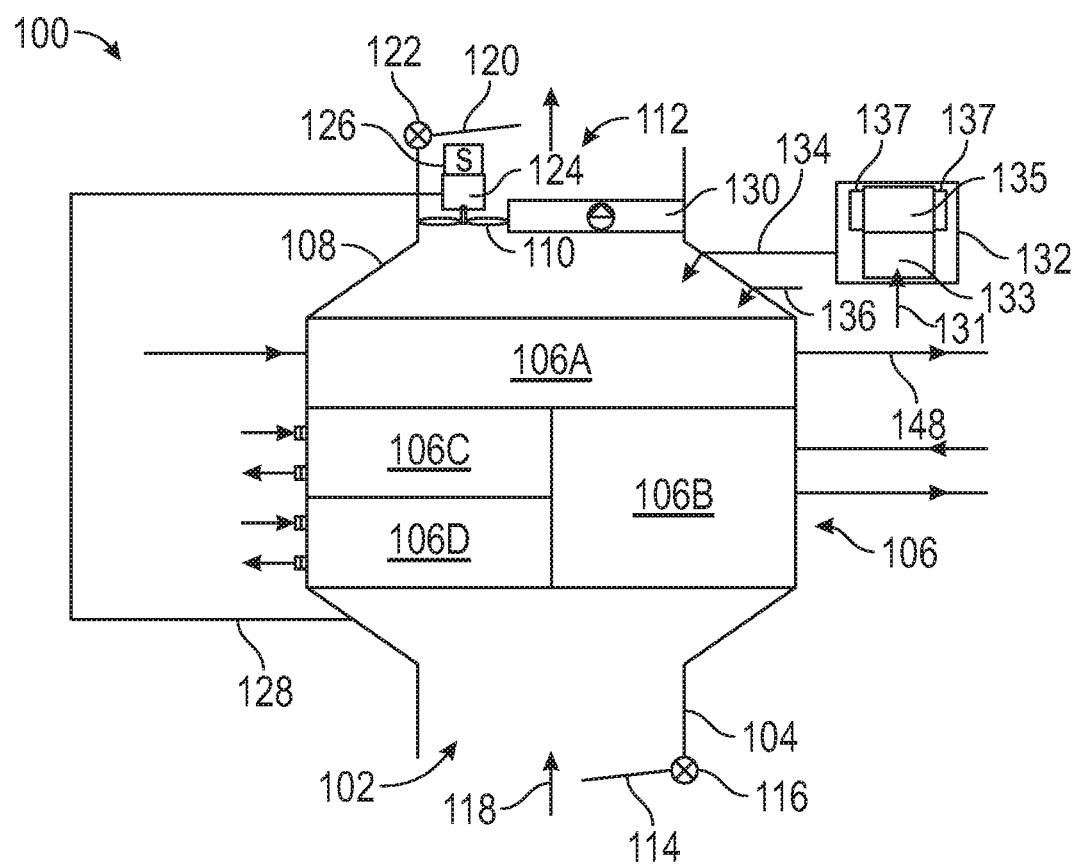
FIG. 1 is a schematic view of a ram air cooling system in accordance with an embodiment of the disclosure.
Figure 2:
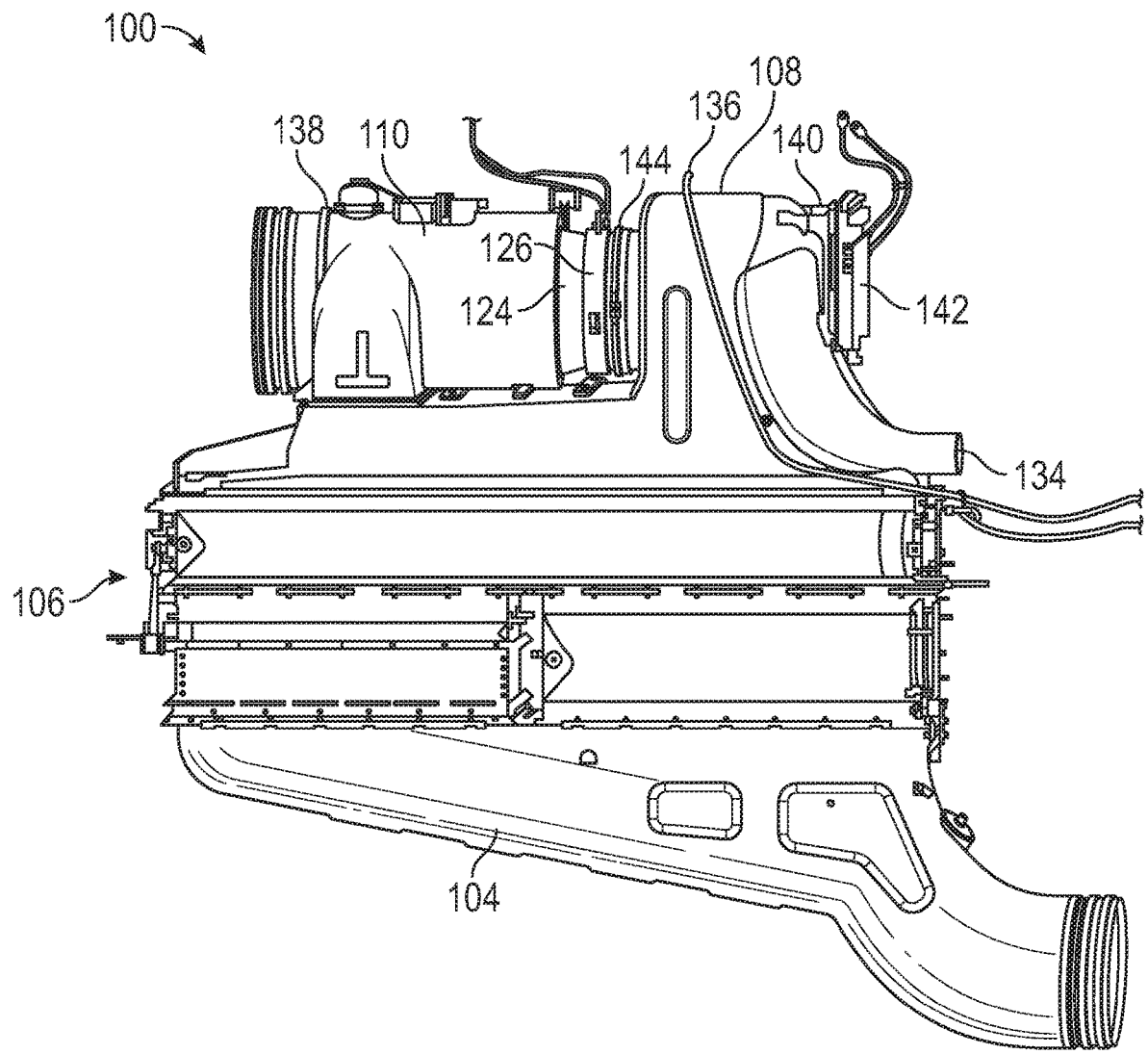
FIG. 2 is a perspective view of the ram air cooling system of FIG. 1 in accordance with an embodiment of the disclosure.

Referring to the drawings, shown in FIG. 1 is a schematic view of a ram air cooling system 100 for an aircraft environmental control system (ECS). The ram air cooling system 100 includes a ram air inlet 102, a ram inlet header 104, a heat exchanger assembly 106, a ram air outlet header 108, a ram air fan 110, and a ram air outlet 112. When opened, a ram air inlet door 114 controlled by a ram air inlet door actuator 116 allows ram air 118 to enter the ram inlet header 104, pass through the heat exchanger assembly 106 to the ram air outlet header 108 and exits through the ram air outlet 112. A ram air outlet door 120 is controlled by a ram air outlet door actuator 122 at the ram air outlet 112. The ram air fan 110 can be used to increase a flow rate of the ram air 118 through the ram air cooling system 100. Alternatively, the ram air 118 may be bypassed around the ram air fan 110 through a ram air fan housing 138 as depicted in FIG. 2. An electric motor 124 drives the ram air fan 110 and may be controlled using a speed sensor 126. The electric motor 124 can receive a ram fan bearing cooling flow 128 drawn from the ram inlet header 104. The ram air cooling system 100 may also include a check valve 130 to control for overpressure conditions. In an embodiment, the heat exchanger assembly 106 includes a primary heat exchanger 106A, a secondary heat exchanger 106B, a tertiary heat exchanger 106C, and a quaternary heat exchanger 106D. A cooled flow 148 from the primary heat exchanger 106A may be used to cool various heat loads. A water collector overflow drain 136 is also routed to the ram air outlet header 108.

Also depicted in FIG. 1, a cabin air compressor (CAC) 132 draws in air from the atmosphere through a compressor impeller 133 at a CAC compressor inlet 131 and provides a CAC motor cooling return 134 to the ram air outlet header 108. The compressor impeller 133 can be driven by a CAC motor 135. A pressure differential between the CAC compressor inlet 131 and the CAC motor cooling return 134 drives a cooling flow to motor windings 137 of the CAC motor 135. A higher pressure differential increases a cooling mass flow rate through the CAC motor 135. In embodiments, effectiveness of the cooling can impact the reliability of the CAC motor 135, particularly in high temperature environments. The pressure at the CAC compressor inlet 131 is uncontrolled in the ram air cooling system 100 and is a function of atmospheric pressure. To increase the pressure differential between the CAC compressor inlet 131 and the CAC motor cooling return 134, embodiments reduce the discharge pressure of the CAC motor cooling return 134.

FIG. 2 is a perspective view of an embodiment of the ram air cooling system 100 of FIG. 1. The heat exchanger assembly 106 is coupled to the ram inlet header 104 and the ram air outlet header 108. The ram air outlet header 108 receives heated ram air that passes through the heat exchanger assembly 106. The ram air outlet header 108 also receives a heated bearing cooling supply return from the CAC motor cooling return 134. The ram air outlet header 108 can also receive water at the water collector overflow drain 136. A ram air fan housing 138 is coupled to the ram air outlet header 108 via a clamp 144 and can receive a combination of heated ram air, heated bearing cooling supply return air, and water. The ram air fan housing 138 contains the ram air fan 110, electric motor 124, and speed sensor 126 of FIG. 1. The ram air outlet header 108 also includes a mounting bracket 140 for a pack control unit 142. The pack control unit 142 may include electronics to control electric components of the ram air cooling system 100, such as the ram air inlet door actuator 116, the ram air outlet door actuator 122, and/or the electric motor 124 of FIG. 1.

Figure 3:
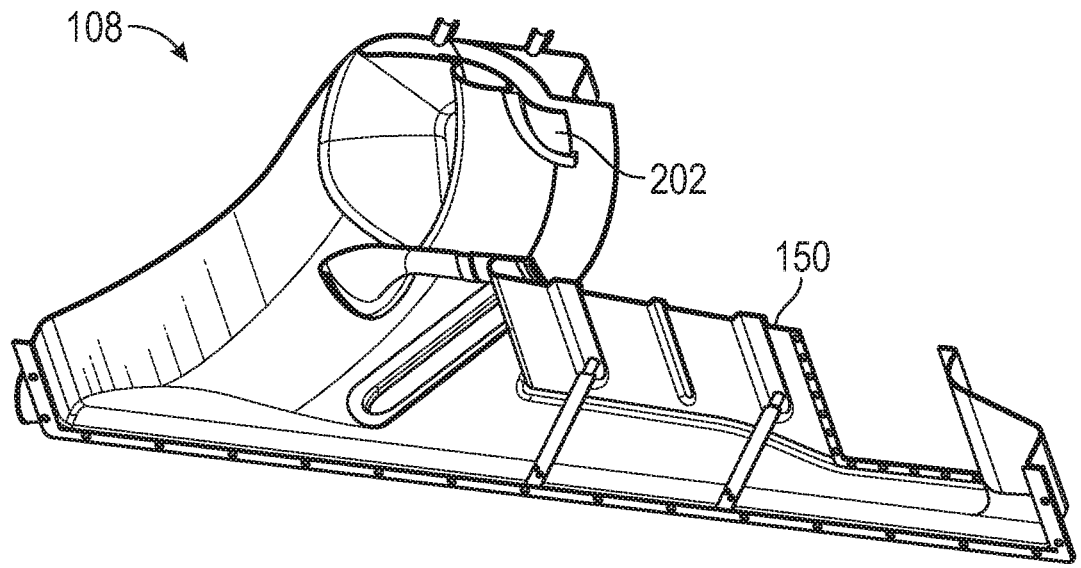
FIG. 3 is a sectional view of a ram air outlet header in accordance with an embodiment of the disclosure.

FIG. 3 depicts a cross section of the ram air outlet header 108 of FIGS. 1 and 2 having a header body 150 with a CAC motor cooling flow enhancement cowl 202 coupled thereto. Further details of the CAC motor cooling flow enhancement cowl 202 are described with respect to FIGS. 4, 5, 6, 7, and 8. The header body 150 includes a CAC motor cooling duct 152 that intersects a ram air fan flow path 154 at a CAC motor cooling duct discharge 156 in a bell mouth 158 upstream from a ram air fan inlet interface 160. The CAC motor cooling flow enhancement cowl 202 includes a cowl body 204 that extends from the CAC motor cooling duct discharge 156 with a backward facing step 206 that forms an air dam in the ram air flow path 154 to divert ram system air away from CAC motor cooling duct discharge 156. A coupling interface 208 is formed at an upstream end 210 of the cowl body 204 to engage with a transition edge 162 of the CAC motor cooling duct discharge 156. The coupling interface 208 can be contoured to at least partially wrap around an interior surface 164 of the CAC motor cooling duct 152 and an interior surface 166 of the bell mouth 158.

Figure 4:
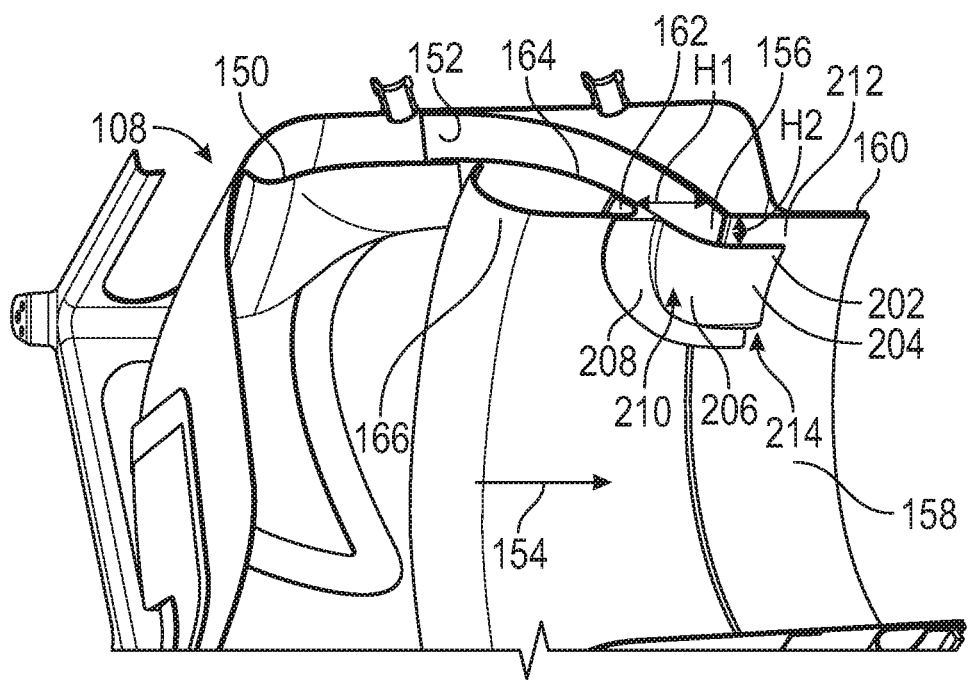
FIG. 4 depicts a partial sectional view of a ram air outlet header in accordance with an embodiment of the disclosure.
Figure 5:
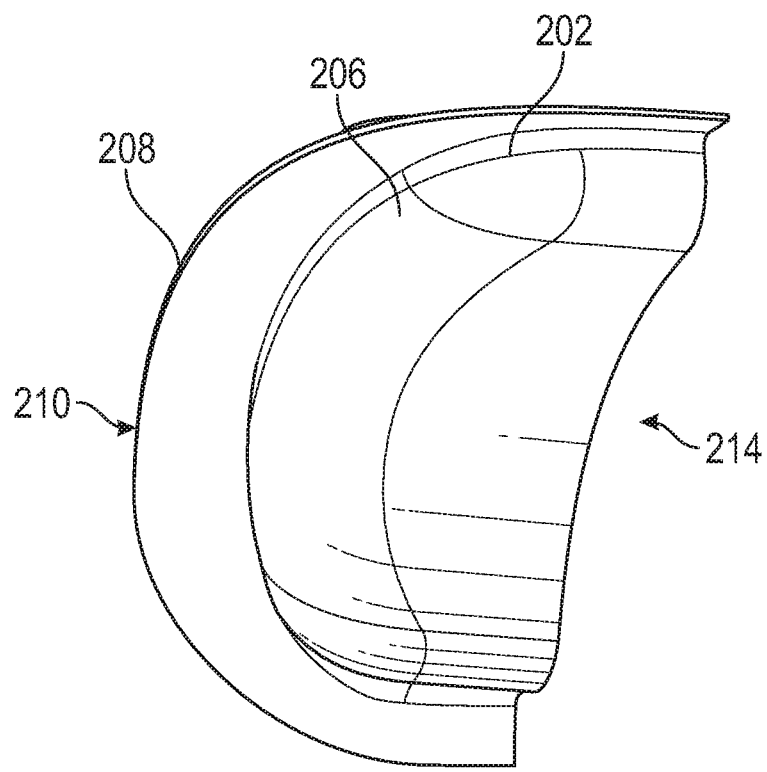
FIGS. 5-8 depict perspective views of a CAC motor cooling flow enhancement cowl in accordance with an embodiment of the disclosure.
Figure 6:
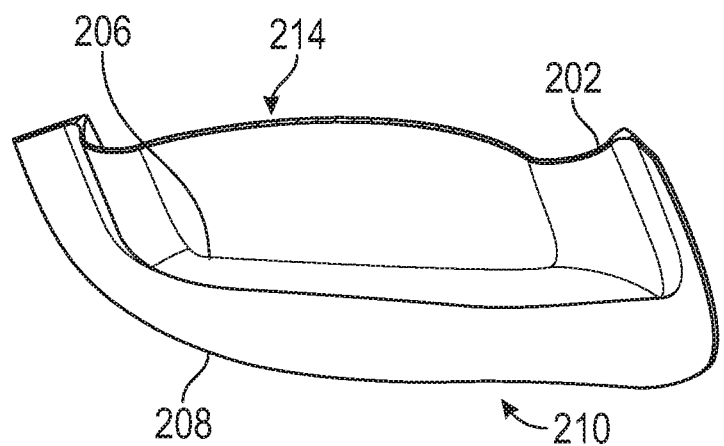
Figure 7:
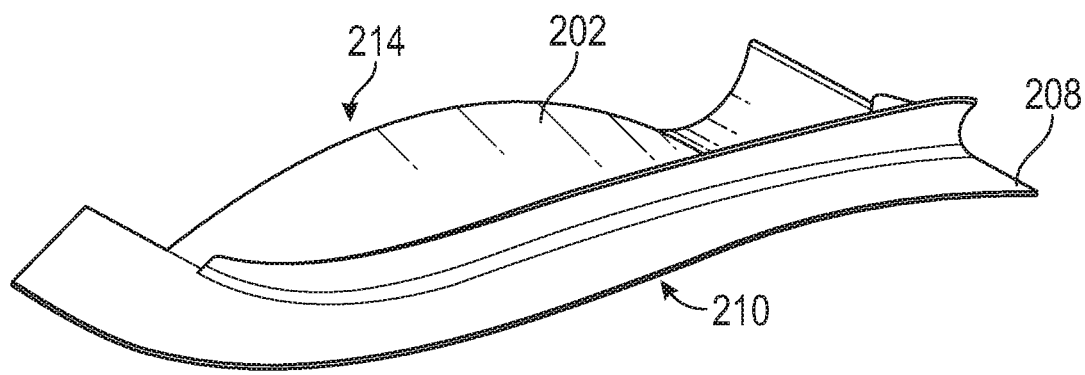
Figure 8:
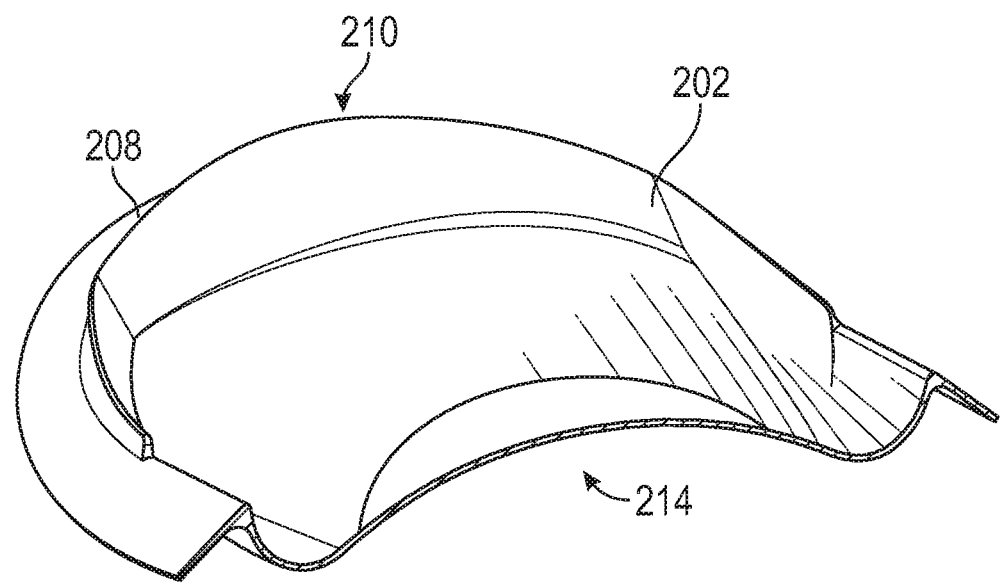
Figure 9:
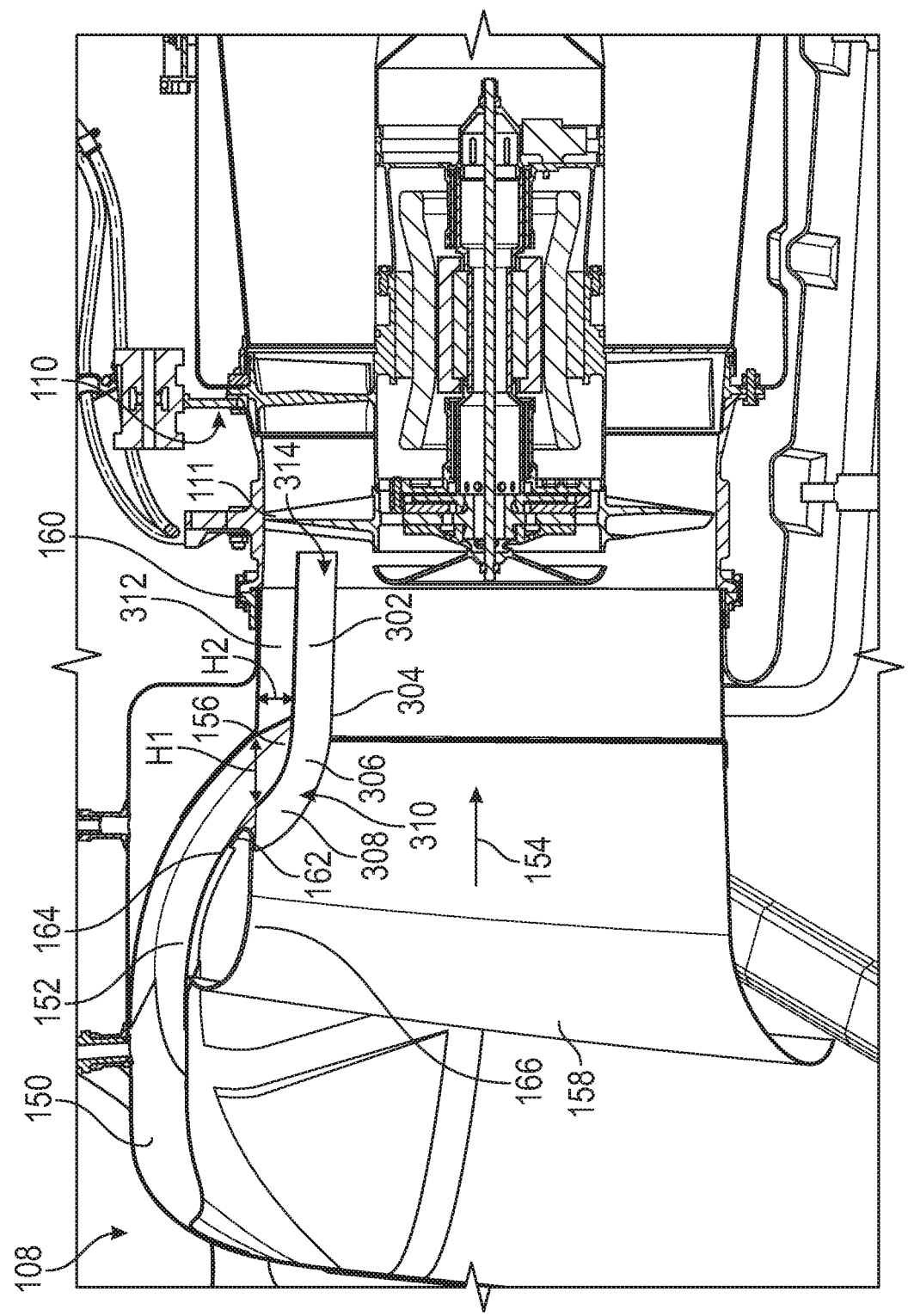
FIG. 9 depicts a partial sectional view of a ram air outlet header and a ram air fan in accordance with an embodiment of the disclosure.
Figure 10:
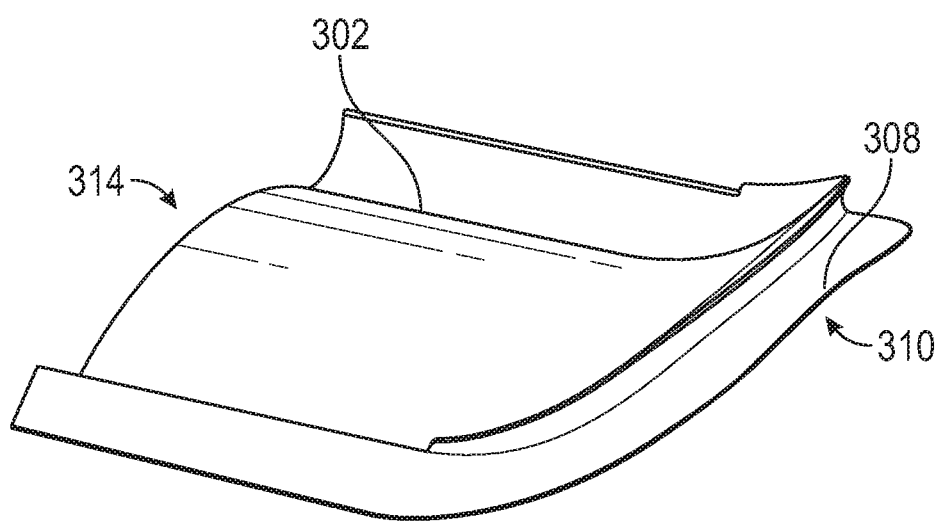
FIGS. 10-12 depict perspective views of a CAC motor cooling flow enhancement cowl in accordance with an embodiment of the disclosure.
Figure 11:
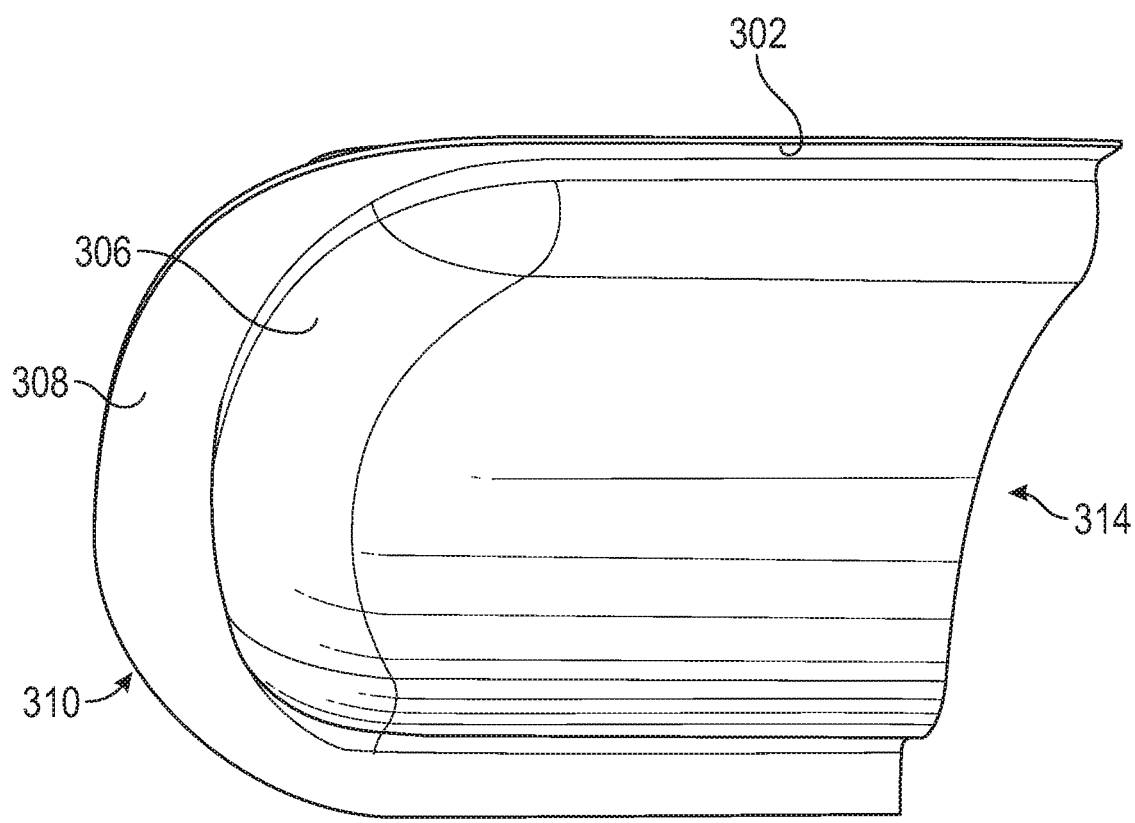
Figure 12:
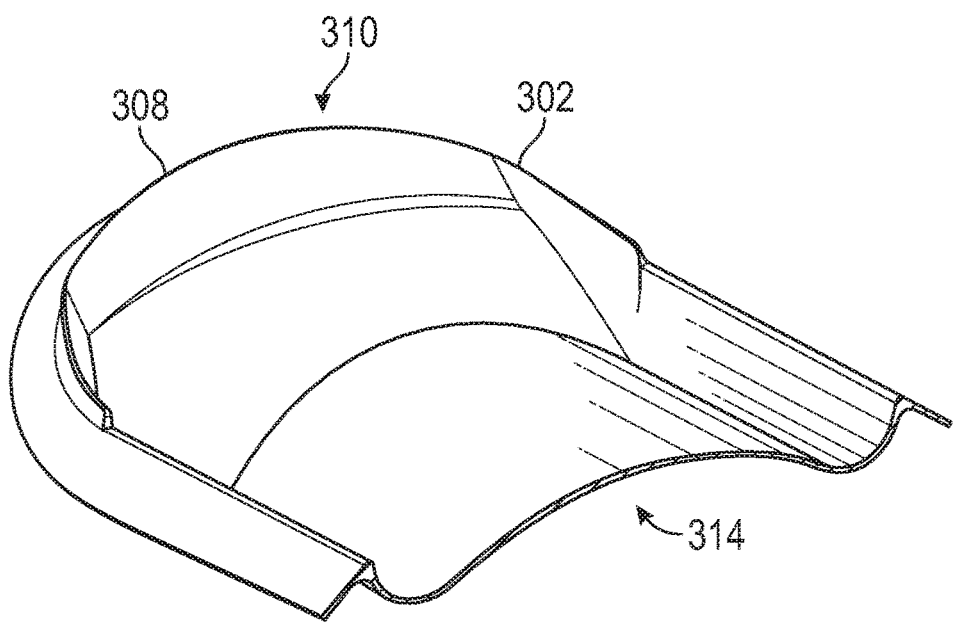
Figure 13:
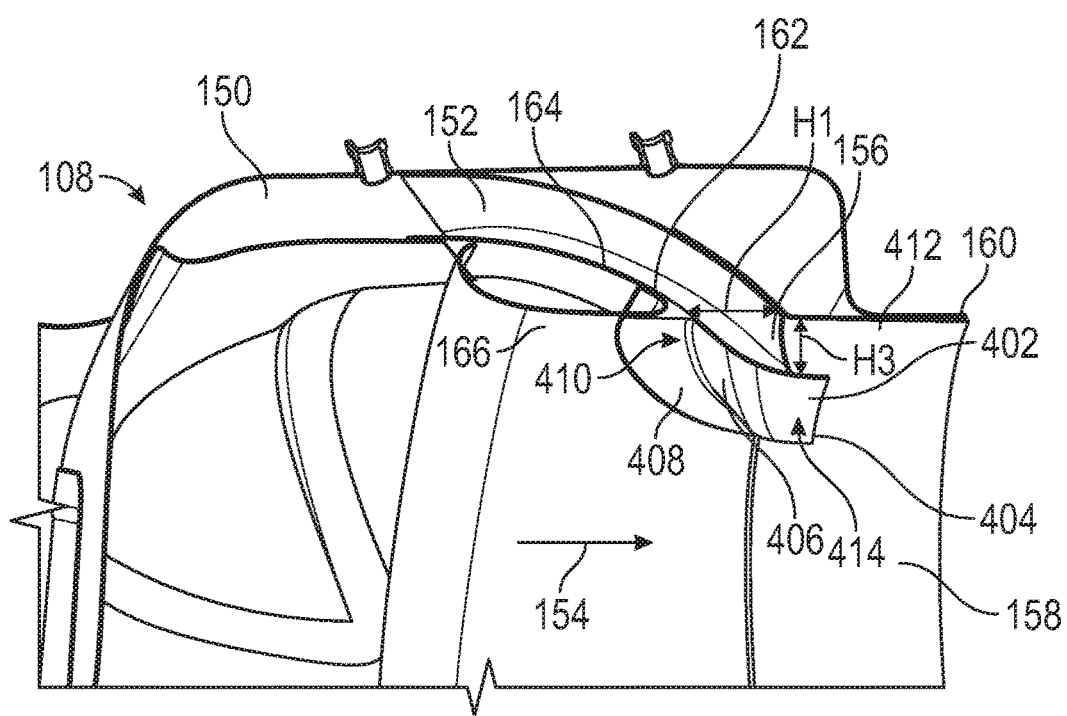
FIG. 13 depicts a partial sectional view of a ram air outlet header in accordance with an embodiment of the disclosure.
Figure 14:
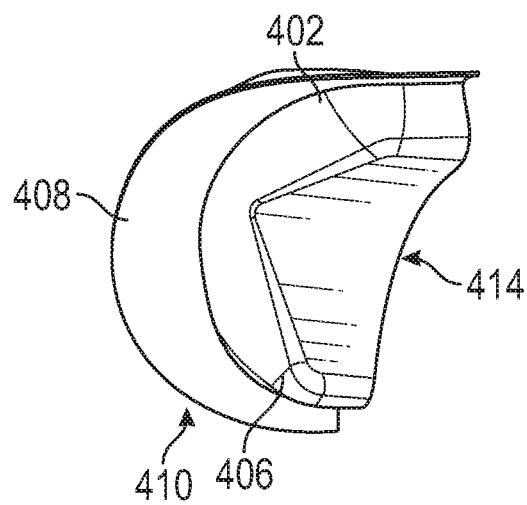
FIGS. 14-16 depict perspective views of a CAC motor cooling flow enhancement cowl in accordance with an embodiment of the disclosure.
Figure 15:
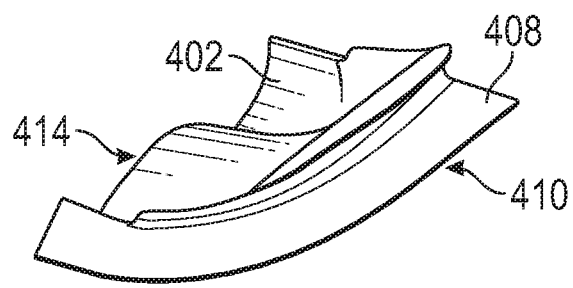
Figure 16:
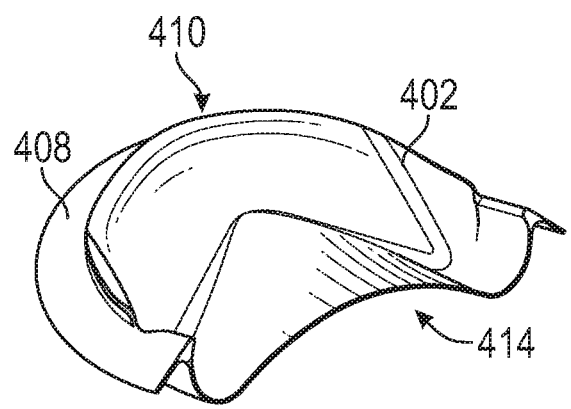
Figure 17:
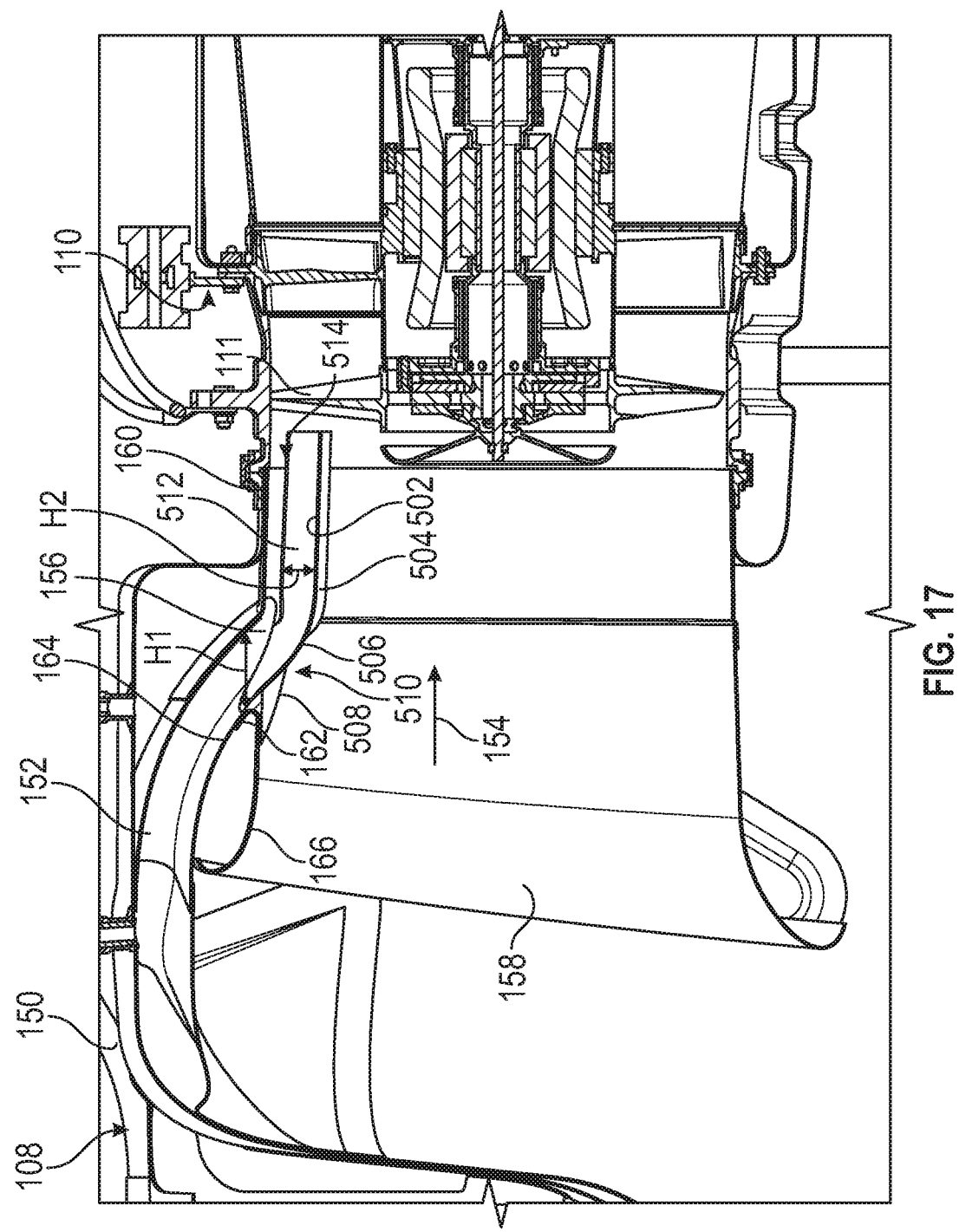
FIG. 17 depicts a partial sectional view of a ram air outlet header and a ram air fan in accordance with an embodiment of the disclosure.
Figure 18:
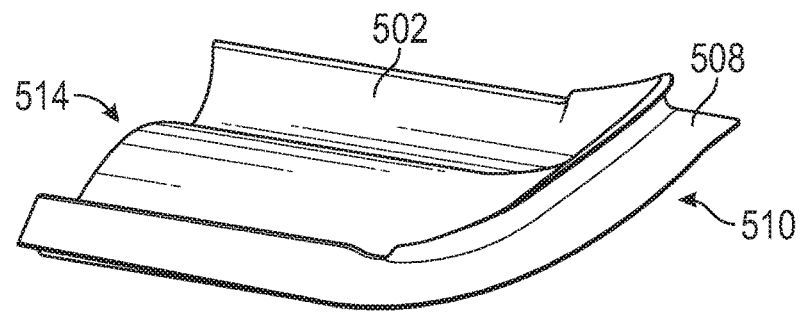
FIGS. 18-20 depict perspective views of a CAC motor cooling flow enhancement cowl in accordance with an embodiment of the disclosure.
Figure 19:
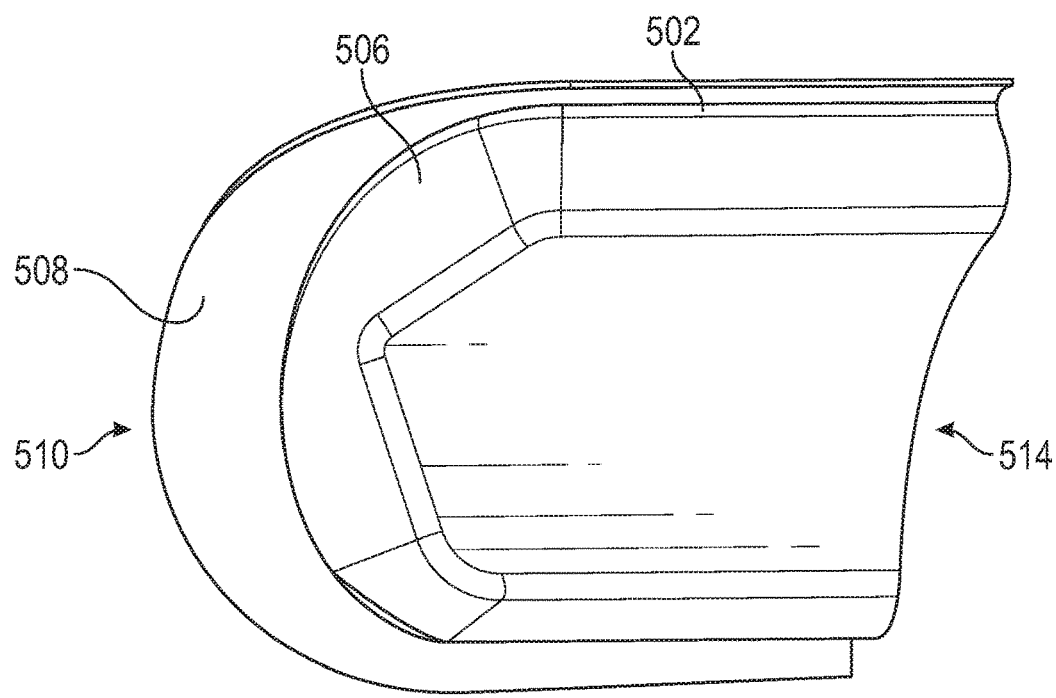
Figure 20:
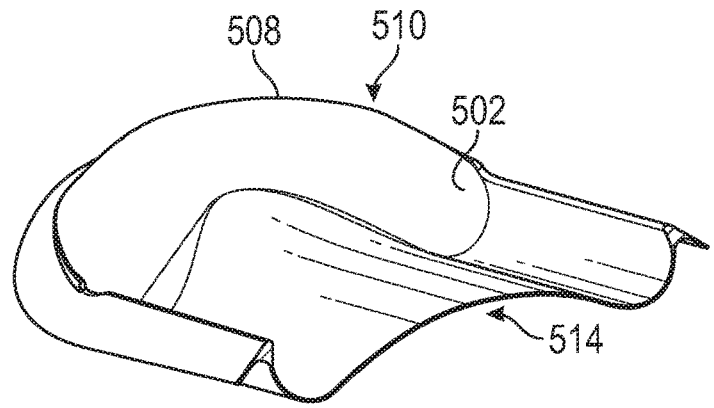
Figure 21:
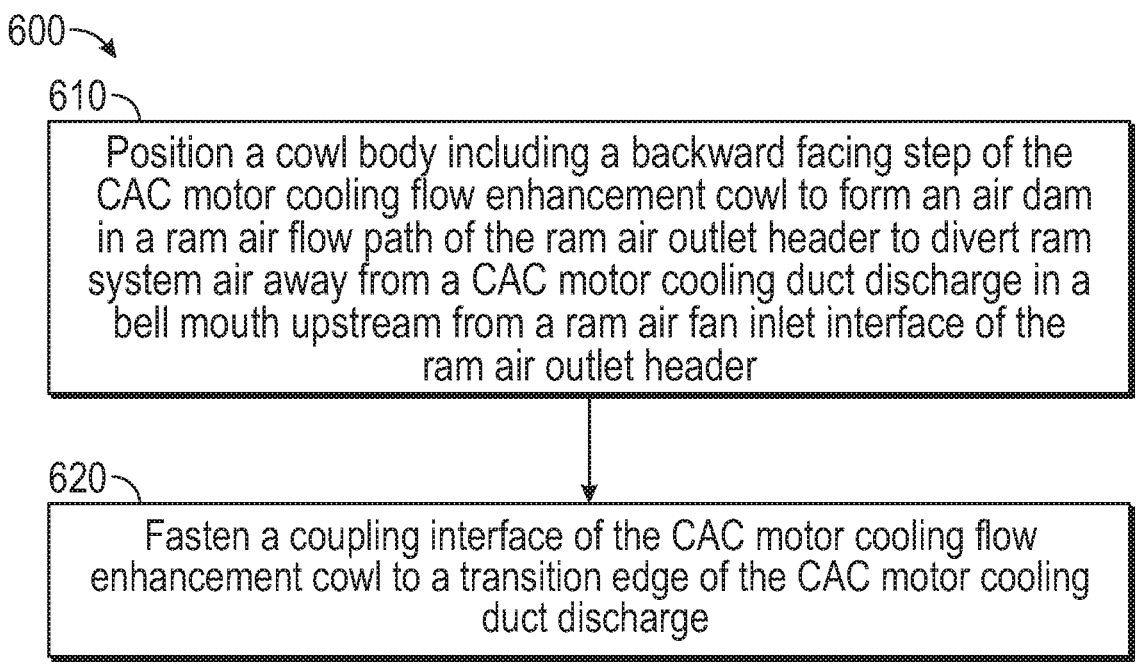
FIG. 21 depicts a process for installing a CAC motor cooling flow enhancement cowl in a ram air outlet header in accordance with an embodiment of the disclosure.

The cowl body 204 forms a CAC motor cooling duct extension channel 212 with respect to the bell mouth 158. The CAC motor cooling duct extension channel 212 can be sized to partially extend into the bell mouth 158 when the coupling interface 208 is engaged with the transition edge 162 of the CAC motor cooling duct discharge 156. In the example of FIG. 4, a channel height H2 of the CAC motor cooling duct extension channel 212 is less than a channel height H1 at the CAC motor cooling duct discharge 156. In other embodiments, the channel height H2 of the CAC motor cooling duct extension channel 212 can be greater than or equal to the channel height H1 at the CAC motor cooling duct discharge 156.

In embodiments, the CAC motor cooling return 134 of FIG. 1 is routed through the CAC motor cooling duct 152 and the CAC motor cooling duct extension channel 212 to merge with the ram air fan flow path 154 at a downstream end 214 of the CAC motor cooling flow enhancement cowl 202. The backward facing step 206 creates a lower pressure zone in the ram air fan flow path 154 allowing the CAC motor cooling return 134 to discharge into the ram air fan flow path 154 at a lower static pressure. The reduced static pressure can increase a pressure differential with respect to the CAC motor 135 of FIG. 1 to drive an increased cooling flow through the CAC motor 135, which reduces the temperature of the CAC motor 135 to increase motor reliability. A number of sizing variations of the CAC motor cooling flow enhancement cowl 202 are contemplated as depicted in the examples of FIGS. 9-20.

In the example of FIGS. 9-12, CAC motor cooling flow enhancement cowl 302 has a cowl body 304 that forms a CAC motor cooling duct extension channel 312 with respect to the bell mouth 158. The CAC motor cooling duct extension channel 312 is sized to extend in the bell mouth 158 beyond the ram air fan inlet interface 160 when coupling interface 308 is engaged with the transition edge 162 of the CAC motor cooling duct discharge 156. The backward facing step 306 can be substantially similar to the backward facing step 206 of FIG. 4. Also, similar to CAC motor cooling duct extension channel 212 of FIG. 4, the CAC motor cooling duct extension channel 312 can have a channel height H2 that is less than channel height H1 at the CAC motor cooling duct discharge 156. The extended length of the cowl body 304 between the upstream end 310 and the downstream end 314 as compared to the cowl body 204 of FIG. 4 results in CAC motor cooling return 134 exiting the CAC motor cooling duct extension channel 312 in closer proximity to fan blades 111 of the ram air fan 110. A greater pressure differential may be achieved by the CAC motor cooling flow enhancement cowl 302 as compared to the CAC motor cooling flow enhancement cowl 202 of FIG. 2 which may further enhance cooling of the CAC motor 135 of FIG. 1. However, the CAC motor cooling flow enhancement cowl 302 may place non-uniform flow distribution loading on the fan blades 111 as compared to the shorter length of the CAC motor cooling flow enhancement cowl 202 which mixes into the ram air fan flow path 154 further upstream. A non-uniform flow distribution can result in non-uniform blade loading on the fan blades 111, which can cause the fan blades 111 to load and unload upon passing the CAC motor cooling flow enhancement cowl 302. This loading and unloading (once per revolution) can possibly cause the fan blades 111 to fatigue, leading to a potential failure if the loading and unloading cycles occur at too large of an amplitude. Using a shorter cowl allows room for the flow non-uniform distribution to mix out before loading differences impact the fan blades 111.

In the example of FIGS. 13-16, CAC motor cooling flow enhancement cowl 402 has a cowl body 404 that forms a CAC motor cooling duct extension channel 412 with respect to the bell mouth 158. The CAC motor cooling duct extension channel 412 is sized to partially extend into the bell mouth 158 when coupling interface 408 is engaged with the transition edge 162 of the CAC motor cooling duct discharge 156. The backward facing step 406 can be contoured with a different profile than the backward facing step 206 of FIG. 4 to make a deeper CAC motor cooling duct extension channel 412 with a channel height H3 that is greater than channel height H2 of FIG. 4. The cowl body 404 between the upstream end 410 and the downstream end 414 can be similar in length to the cowl body 204 of FIG. 4. A greater pressure differential may be achieved by the CAC motor cooling flow enhancement cowl 402 as compared to the CAC motor cooling flow enhancement cowl 202 of FIG. 2 which may further enhance cooling of the CAC motor 135 of FIG. 1 due to the increased size of channel height H3.

In the example of FIGS. 17-20, CAC motor cooling flow enhancement cowl 502 has a cowl body 504 that forms a CAC motor cooling duct extension channel 512 with respect to the bell mouth 158. The CAC motor cooling duct extension channel 512 is sized to extend in the bell mouth 158 beyond the ram air fan inlet interface 160 when coupling interface 508 is engaged with the transition edge 162 of the CAC motor cooling duct discharge 156. The backward facing step 506 can differ from the backward facing step 206 of FIG. 4 but can be similar, for instance, to the backward facing step 406 of FIG. 13. Also, similar to CAC motor cooling duct extension channel 412 of FIG. 13, the CAC motor cooling duct extension channel 512 can have a channel height H3 that is greater than channel height H2 of FIG. 4. The extended length of the cowl body 504 between the upstream end 510 and the downstream end 514 as compared to the cowl body 204 of FIG. 4 results in CAC motor cooling return 134 exiting the CAC motor cooling duct extension channel 512 in closer proximity to fan blades 111 of the ram air fan 110. A greater pressure differential may be achieved by the CAC motor cooling flow enhancement cowl 502 as compared to the CAC motor cooling flow enhancement cowl 202 of FIG. 2 which may further enhance cooling of the CAC motor 135 of FIG. 1. However, the CAC motor cooling flow enhancement cowl 502 may place a non-uniform loading distribution on the fan blades 111 as compared to the shorter length of the CAC motor cooling flow enhancement cowl 202 which mixes into the ram air fan flow path 154 further upstream. Thus, as can be seen, adjusting various sizing parameters of a CAC motor cooling flow enhancement cowl can balance cooling effects on the CAC motor 135 and loading on fan blades 111.

A method 600 of installing a CAC motor cooling flow enhancement cowl 202, 302, 402, 502 in a ram air outlet header 108 is described in reference to FIGS. 1-21. At block 610, a cowl body 204, 304, 404, 504 including a backward facing step 206, 306, 406, 506 of the CAC motor cooling flow enhancement cowl 202, 302, 402, 502 is positioned to form an air dam in a ram air flow path 154 of the ram air outlet header 108 to divert ram system air away from a CAC motor cooling duct discharge 156 in a bell mouth 158 upstream from a ram air fan inlet interface 160 of the ram air outlet header 108. At block 620, a coupling interface 208, 308, 408, 508 of the CAC motor cooling flow enhancement cowl 202, 302, 402, 502 is fastened (e.g., glued, clamped, bolted, welded, etc.) to a transition edge 162 of the CAC motor cooling duct discharge 156. The coupling interface 208, 308, 408, 508 can be contoured to at least partially wrap around an interior surface 164 of a CAC motor cooling duct 152 of the ram air outlet header 108 and an interior surface 166 of the bell mouth 158. The cowl body 204, 304, 404, 504 can form a CAC motor cooling duct extension channel 212, 312, 412, 512 with respect to the bell mouth 158. The CAC motor cooling duct extension channel 212, 312, 412, 512 can extend partially in the bell mouth 158 or beyond the ram air fan inlet interface 160. A channel height H2, H3 of the CAC motor cooling duct extension channel 212, 312, 412, 512 can be greater than, less than, or have substantially the same channel height H1 at the CAC motor cooling duct discharge 156.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A ram air outlet header comprising:
a header body comprising a cabin air compressor (CAC) motor cooling duct that intersects a ram air fan flow path at a CAC motor cooling duct discharge in a bell mouth upstream from a ram air fan inlet interface; and
a CAC motor cooling flow enhancement cowl comprising:
a cowl body that extends from the CAC motor cooling duct discharge with a backward facing step that forms an air dam in the ram air flow path to divert ram system air away from the CAC motor cooling duct discharge; and
a coupling interface formed at an upstream end of the cowl body to engage with a transition edge of the CAC motor cooling duct discharge.

2. The ram air outlet header of claim 1, wherein the cowl body forms a CAC motor cooling duct extension channel with respect to the bell mouth.

3. The ram air outlet header of claim 2, wherein the CAC motor cooling duct extension channel partially extends into the bell mouth.

4. The ram air outlet header of claim 2, wherein the CAC motor cooling duct extension channel extends in the bell mouth beyond the ram air fan inlet interface.

5. The ram air outlet header of claim 2, wherein a channel height of the CAC motor cooling duct extension channel is less than a channel height at the CAC motor cooling duct discharge.

6. The ram air outlet header of claim 2, wherein a channel height of the CAC motor cooling duct extension channel is greater than a channel height at the CAC motor cooling duct discharge.

7. The ram air outlet header of claim 1, wherein a coupling interface formed at an upstream end of the cowl body engages with a transition edge of the CAC motor cooling duct discharge, and the coupling interface is contoured to at least partially wrap around an interior surface of the CAC motor cooling duct and an interior surface of the bell mouth.

8. A method for installing a cabin air compressor (CAC) motor cooling flow enhancement cowl in a ram air outlet header, the method comprising:
positioning a header body of the ram air outlet header comprising a CAC motor cooling duct to intersect a ram air fan flow path at a CAC motor cooling duct discharge in a bell mouth upstream from a ram air fan inlet interface;
positioning a cowl body comprising a backward facing step of the CAC motor cooling flow enhancement cowl to form an air dam in a ram air flow path of the ram air outlet header to divert ram system air away from the CAC motor cooling duct discharge in the bell mouth upstream from the ram air fan inlet interface of the ram air outlet header; and
fastening a coupling interface of the CAC motor cooling flow enhancement cowl to a transition edge of the CAC motor cooling duct discharge.

9. The method of claim 8, wherein the cowl body forms a CAC motor cooling duct extension channel with respect to the bell mouth.

10. The method of claim 9, wherein the CAC motor cooling duct extension channel extends in the bell mouth beyond the ram air fan inlet interface.

11. The method of claim 9, wherein a channel height of the CAC motor cooling duct extension channel is less than a channel height at the CAC motor cooling duct discharge.

12. The method of claim 9, wherein a channel height of the CAC motor cooling duct extension channel is greater than a channel height at the CAC motor cooling duct discharge.

13. The method of claim 8, wherein the coupling interface is contoured to at least partially wrap around an interior surface of the CAC motor cooling duct of the ram air outlet header and an interior surface of the bell mouth.

* * * * *